(12) United States Patent
Qiu et al.

(10) Patent No.: US 12,079,259 B2
(45) Date of Patent: Sep. 3, 2024

(54) DATA PROCESSING METHOD AND DEVICE AND ELECTRONIC APPARATUS

(71) Applicant: Lenovo (Beijing) Co., Ltd., Beijing (CN)

(72) Inventors: Pengtao Qiu, Beijing (CN); Guoguang Zhao, Beijing (CN); Si Ye, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 17/084,547

(22) Filed: Oct. 29, 2020

(65) Prior Publication Data
US 2021/0133226 A1 May 6, 2021

(30) Foreign Application Priority Data
Oct. 30, 2019 (CN) .......................... 201911045264.8

(51) Int. Cl.
*G06F 16/33* (2019.01)
*G06F 16/332* (2019.01)
*G06F 16/338* (2019.01)
*G06F 40/205* (2020.01)

(52) U.S. Cl.
CPC ...... *G06F 16/3344* (2019.01); *G06F 16/3329* (2019.01); *G06F 16/338* (2019.01); *G06F 40/205* (2020.01)

(58) Field of Classification Search
CPC .................................................. G06F 16/3344
See application file for complete search history.

(56) References Cited

U.S. PATENT DOCUMENTS

| | | | |
|---|---|---|---|
| 2019/0043106 A1* | 2/2019 | Talmor | G06N 20/00 |
| 2019/0050239 A1* | 2/2019 | Caldwell | G06F 11/0793 |
| 2019/0251165 A1* | 8/2019 | Bachrach | G06N 3/084 |
| 2020/0012721 A1* | 1/2020 | Pasupalak | G06F 40/295 |

FOREIGN PATENT DOCUMENTS

| | | |
|---|---|---|
| CN | 105306281 A | 2/2016 |
| CN | 108306851 A | 7/2018 |

\* cited by examiner

*Primary Examiner* — Van H Oberly
(74) *Attorney, Agent, or Firm* — ANOVA LAW GROUP, PLLC

(57) ABSTRACT

A data processing method includes obtaining a first input data of a user, the first input data being displayed in a first section and outputting a first content in a second section different from the first section based on the first input data. The first content includes a plurality of sub-contents. The plurality of sub-contents are based on phrases correlated with the first input data. The first content prompts for input corresponding contents at a plurality of target positions corresponding to the plurality of the sub-contents. The plurality of target positions are correlated with the phrases corresponding to the plurality of sub-contents.

17 Claims, 6 Drawing Sheets

```
Name is ##;
Identification number is ##;
Departure place is ##;
Arrival place is ##。
```

Second section

FIG. 5

```
    Name is__, Identification
number is__, Departure place is__,
Arrival place is__.
```

Second section

FIG. 6

DATA PROCESSING METHOD AND DEVICE AND ELECTRONIC APPARATUS

CROSS-REFERENCE TO RELATED APPLICATION

This application claims priority to Chinese Patent Application No. 201911045264.8, filed on Oct. 30, 2019, the entire content of which is incorporated herein by reference.

TECHNICAL FIELD

The present disclosure generally relates to the data processing technology field and, more particularly, to a data processing method and device and an electronic apparatus.

BACKGROUND

In a smart customer service system, to provide better service for a user and answer a user question, the user needs to input basic information, such as name, date, etc. The smart customer service system then performs semantic analysis on the information input by the user and provides feedback of a corresponding content for the user.

When requesting the user to input the information, the smart customer service system usually asks the user for information multiple times. For example, the smart customer service system outputs one question each time for multiple times to request the user to input the information. Therefore, the user needs to answer each question individually, which results in a long time for the smart customer service system to obtain the information and causes a low efficiency for obtaining the information.

SUMMARY

Embodiments of the present disclosure provide a data processing method includes obtaining a first input data of a user, the first input data being displayed in a first section and outputting a first content in a second section different from the first section based on the first input data. The first content includes a plurality of sub-contents. The plurality of sub-contents are based on phrases correlated with the first input data. The first content prompts for input corresponding contents at a plurality of target positions corresponding to the plurality of the sub-contents. The plurality of target positions are correlated with the phrases corresponding to the plurality of sub-contents.

Embodiments of the present disclosure provide a data processing device including a data acquisition circuit and a content output circuit. The data acquisition circuit is configured to obtain a first input data of a user, the first input data being displayed in a first section. The content output circuit is configured to output a first content in a second section different from the first section. The first content includes a plurality of sub-contents. The plurality of sub-contents are based on phrases correlated with the first input data. The first content prompts for input corresponding contents at a plurality of target positions corresponding to the plurality of the sub-contents. The plurality of target positions are correlated with the phrases corresponding to the plurality of sub-contents.

Embodiments of the present disclosure provide an electronic apparatus including a display, an input device, and a processor. The display includes a first section and a second section different from the first section and configured to output a content. The input device is configured to obtain a first input data of a user. The first input data is displayed in the first section. The processor is configured to output a first content in the second section based on the first input data. The first content includes a plurality of sub-contents. The plurality of sub-contents are based on phrases correlated with the first input data. The first content prompts for input corresponding contents at a plurality of target positions corresponding to the plurality of the sub-contents. The plurality of target positions are correlated with the phrases corresponding to the plurality of sub-contents.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 5, FIG. 6, and FIG. 7 illustrate schematic diagrams of another example according to some embodiments of the present disclosure.

DETAILED DESCRIPTION OF THE EMBODIMENTS

Technical solutions of embodiments of the present disclosure are described in connection with the accompanying drawings. Described embodiments are merely exemplary and some embodiments of the present disclosure but not all embodiments. Based on the embodiments of the present disclosure, all other embodiments obtained by those of ordinary skill in the art without creative effort should be within the scope of the present disclosure.

Figure 1:
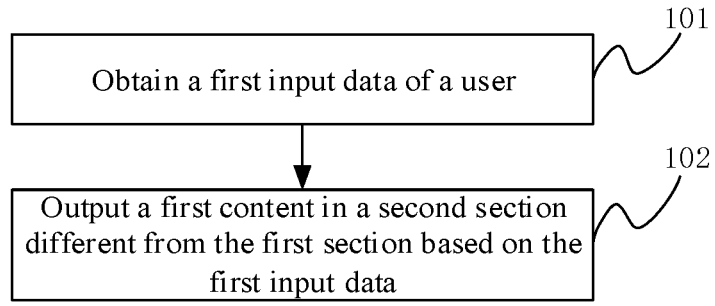
FIG. 1 illustrates a schematic flowchart of a data processing method according to some embodiments of the present disclosure.

FIG. 1 illustrates a schematic flowchart of a data processing method according to some embodiments of the present disclosure. This method may be applied to an electronic apparatus, which can perform data input and output, such as a cellphone, a pad, or other terminals. The method of embodiments of the present disclosure is mainly used to improve an efficiency of obtaining a user input content through an output content when the electronic apparatus outputs the content.

In some embodiments, the method of embodiments of the present disclosure may include the following processes.

At 101, the method includes obtaining a first input data of a user.

Figure 2:
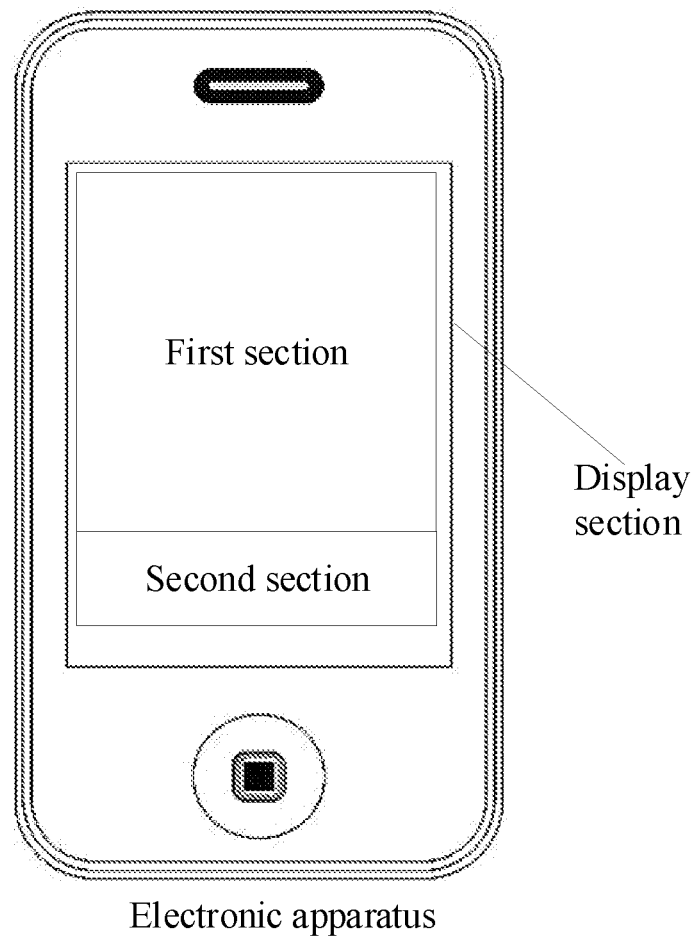
FIG. 2 illustrates a schematic diagram of an example according to some embodiments of the present disclosure.

As shown in FIG. 2, the electronic apparatus may display the first input data input by the user in a first section. The first section may be a portion of a display section of the electronic apparatus. Parameters of position, dimension, section shape, and display method may be set according to users' habits or personal needs for the electronic apparatus. The first section shown in FIG. 2 is located in an upper section of the display section of the electronic apparatus.

In some embodiments, the first input data may be data of characterizing user needs. For example, a content data of a question provided to the smart customer service system by the user, a content data of a matter to achieve expressed to the smart customer service system by the user, etc. As shown in FIG. 2, the first input data is "I want to book a flight ticket."

At 102, the method includes outputting a first content in a second section different from the first section based on the first input data.

The first content may include a plurality of sub-contents. Each sub-content may be generated based on phrases correlated to the first input data. The first content may be used to prompt the user to input corresponding contents at a plurality of target positions corresponding to the sub-contents. Each target position is correlated to a phrase corresponding to a sub-content.

In some embodiments, the phrase correlated to the first input data may be a phrase extracted from the first input data, or a phrase generated after the smart customer service system performs semantic recognition on the first input data. The phrase is correlated to the semantic of the first input data. Correspondingly, each of the sub-contents of the first content may prompt the user to input the corresponding content at the target position corresponding to each of the sub-contents. That is, each sub-content may correspond to one or more target positions. Each target position is correlated to the phrase corresponding to the sub-content. Therefore, the user may input the corresponding content for the sub-content at one or more target positions corresponding to each sub-content with the prompt of the first content.

The second section is a portion of the display section of the electronic apparatus different from the first section. Parameters of section position, dimension, section shape, and display method may be the same as the first section or set as needed. As shown in FIG. 2, the second section is in a lower section of the display section of the electronic apparatus.

According to the above solution, after obtaining the first input data input by the user and displayed in the first section, the data processing method provided by embodiments of the present disclosure may include outputting the first content in the second section different from the first section. The first content includes the plurality of sub-contents. Each of the sub-contents may be generated based on the phrase correlated to the first input data. Therefore, the first content may prompt the user to input the corresponding content at the target position corresponding to each sub-content. As such, the smart customer service system no longer outputs each of the sub-contents individually multiple times. The smart customer service system may output the first content including the plurality of sub-contents at one time in the display section different from the display section of the input data input by the user. Thus, the smart customer service system may prompt the user to input the corresponding content at the target position corresponding to each sub-content, which is different from the current situation that the user needs to input each content for each of the questions individually. As such, time for outputting the sub-contents multiple times may be saved to improve the efficiency of obtaining the information.

Further, in some embodiments, before, after, or during the smart customer service system outputs the first content in the second section, the smart customer service system may output a prompt message at a lower section of an output position of the first input data in the first section, such as "please input the following information." As such, the smart customer service system may prompt the user to input the corresponding content at the corresponding target position according to the sub-content of the first content output in the second section.

Figure 3:
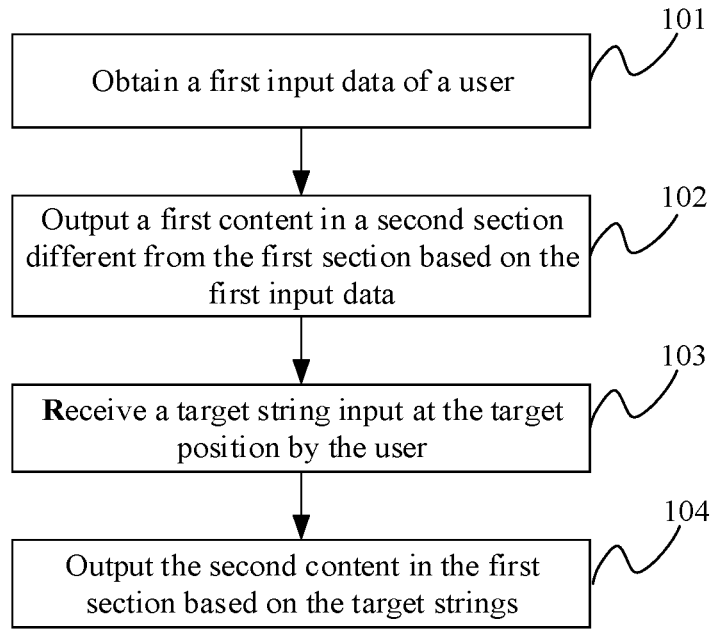
FIG. 3 illustrates another schematic flowchart of a data processing method according to some embodiments of the present disclosure.

Based on the above implementation, in some embodiments, after process 102, the method includes the following processes shown in FIG. 3.

At 103, the method further includes receiving a target string input at the target position by the user.

Since a plurality of target positions may exist, the user may input a plurality of target strings. Therefore, in some embodiments, the electronic apparatus may receive the target string at each of the target positions input by the user.

At 104, the method further includes outputting the second content in the first section at least based on the target strings.

The second content may include at least two target sentences. Each target sentence may at least include a corresponding string and a corresponding phrase. That is after the user inputs the target string at the target position correlated to the phrase corresponding to the sub-content, the smart customer service system may output a plurality of target sentences including the target strings and phrases in the first section. The plurality of target sentences may form the second content.

That is, after obtaining the first input data input by the user, the smart customer service system may output the plurality of sub-contents generated based on the phrases correlated to the first input data in the second section different from the first section, where the first input data is. As such, the plurality of sub-contents may prompt the user to input the corresponding contents at the plurality of the target positions corresponding to the plurality of sub-contents. After the user input the target strings at the plurality of target positions, in some embodiments, the smart customer service system may receive the target strings input by the user and output the plurality of the target sentences including the target strings and the corresponding phrases in the first section, that is, output the second content in the first section as the whole content that the user inputs in the first section. As such, the user may input the target string at the target position corresponding to each of the sub-contents according to the prompt of each of the sub-contents of the first content. Thus, the target strings and the phrases may form the target sentences, and the user may not need to input the whole target sentences, but input key strings prompted by the plurality of sub-contents. Therefore, the complexity of the input operation of the user may be reduced at a certain level, and the wait time of user input may also be reduced. For example, different from the current situation that the user may need to wait to input content after the smart customer service system output a question, the user may input strings at the corresponding target positions for the plurality of sub-contents simultaneously, such that the time consumption of obtaining the information may further be saved to improve the efficiency of obtaining the information.

Figure 4:
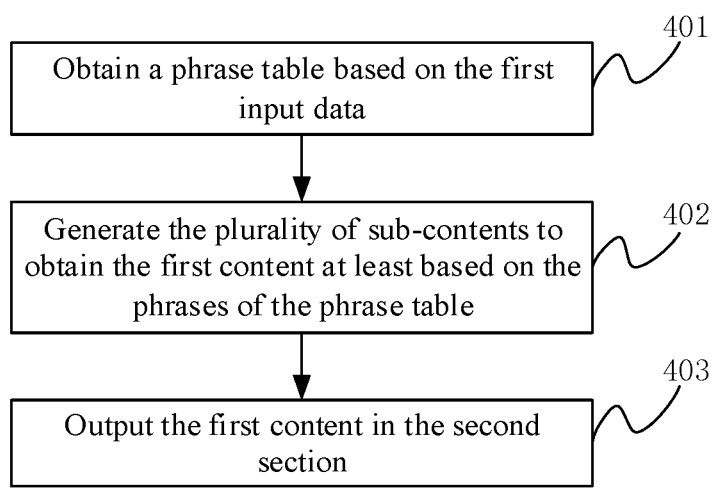
FIG. 4 illustrates a part of a schematic flowchart of a data processing method according to some embodiments of the present disclosure.

In some embodiments, in process 102, as shown in FIG. 4, outputting the first content in the second section different from the first section based on the first input data may be implemented by the following method.

At 401, the method includes obtaining a phrase table based on the first input data.

The phrase table may include at least two phrases correlated to the first input data. The phrases may characterize vacant user information, for example, the phases may include "name," "identification number," etc., to characterize the vacant name and identification number.

In some embodiments, the smart customer service system may obtain at least two phrases correlated to the first input data by performing the semantic analysis on the first input data. For example, the user may input the first input data "I want to book a flight ticket." By performing the semantic analysis on the first input data, the smart customer service system may obtain that the user needs to book a flight ticket. Thereby, the smart customer service system may generate a plurality of phrases characterizing the user information needed for booking the flight ticket, such as phrases of "name," "identification number," "departure place," "arrival place," etc.

In some other embodiments, the smart customer service system may first recognize a text content and/or audio content. For example, the smart customer service system may perform a text content recognition on a letter input data "I want to book a flight ticket" input by the user or perform an audio content recognition on an audio input data input through the microphone by the user to obtain the corresponding text content and/or audio content. The text content may include one or more letters or strings. The audio content may also include one or more audio clips. Then, the smart customer service system may generate the phrase table from a plurality of phrases according to the text content and/or audio content. That is, the smart customer service system may extract at least two phrases correlated to the text content and/or audio content from the plurality of phrases (including phrases of various fields and aspects) to form the phrase table. In the phrase table, the phrases may be correlated to the text content and/or audio content of the first input data. In some embodiments, the smart customer service system may pare the text content and/or audio content after obtaining the text content and/or audio content to obtain feature information characterizing user intention. For example, the smart customer service system may parse "I," "want," "book," and "flight ticket" of the text content to obtain the feature information of "book" and "flight ticket" characterizing that the user needs to book the flight ticket. Further, based on the feature information, the smart customer service system may select the phrases correlated to the text content and/or audio content from the plurality phrases. That is, the smart customer service system may select the phrases correlated to the feature information explicitly correlated to semantic or letter to form the phrase table.

At 402, the method includes generating the plurality of sub-contents to obtain the first content at least based on the phrases of the phrase table.

In some embodiments, the smart customer service system may integrate the phrases of the phrase table and the target positions to generate the plurality of sub-contents to obtain the first content. For example, the smart customer service system may directly connect "name," "identification number," "departure place," and "arrival place" in series with their corresponding target positions such as vacant underlines to form the sub-contents of "name _____," "identification number _____," "departure place _____," and "arrival place _____." These sub-contents may form the first content.

In some other embodiments, the smart customer service system may first obtain at least a sentence format corresponding to each phrase of the phrase table, and then select a target sentence format satisfying the requirements or predetermined rule from these sentence formats. For example, the smart customer service system may select the target sentence format randomly or according to a user reading manner obtained by parsing history user data. After selecting the target sentence format, the smart customer service system may cause each phrase to generate the corresponding target sentence. The target sentence may use the selected target sentence format, and the target sentence at least may include the corresponding phrases. For example, the smart customer service system may select the corresponding sentence format for the phrases of "name," "identification number," "departure place," and "arrival place," such as the format of "is." Then, the smart customer service system may cause each of the phrases to generate the target sentences at least including each of the phrases, such as "name is," "identification number is," "departure place is," and "arrival place is." Further, the smart customer service system may replace "**" of the target sentences with the target positions, such as the underlines including initial strings to obtain the sub-contents corresponding to the phrases: "name is ##," "identification number is ##," "departure place is ##," and "arrival place is ##." These sub-contents may form the first content.

At 403, the method includes outputting the first content in the second section.

In some embodiments, as shown in FIG. 5, the smart customer service system outputs each of the sub-contents of the first content in the second section in rows or paragraphs. In some other embodiments, as shown in FIG. 6 the smart customer service system connects the sub-contents by using connection signs or sentence connection words in the second section and outputs the connected sub-contents in a paragraph.

In some embodiments, in the first content obtained above, the target sentence may include the target positions correlated with the phrases. The target positions may include the initial strings or may be vacant. Correspondingly, the target positions may include the following contents.

In a situation, the target positions may include initial strings. The initial strings may be generated based on the historical user input data. For example, the historical user input data may include the name of the user: Zhang San and the departure place A. In this case, the target sentences may include "name is Zhang San," "identification number is ##," "departure place is A," and "arrival place is ##."

Correspondingly, in process 104, outputting the second content in the first section at least based on the target strings may be implemented by the following method.

First, the smart customer service system may replace the target strings with the initial strings at the target positions correlated with the phrases. That is, the smart customer service system may replace the strings at the target positions of the corresponding target sentences with the target strings input by the user received at the target positions to cause the target sentences to at least include the target strings.

Then, the smart customer service system may generate the second content based on the target sentences including the target strings. For example, the smart customer service system may connect the target sentences including the target strings by using the connection signs or sentence connection words to form a paragraph to generate the second content.

Figure 7:
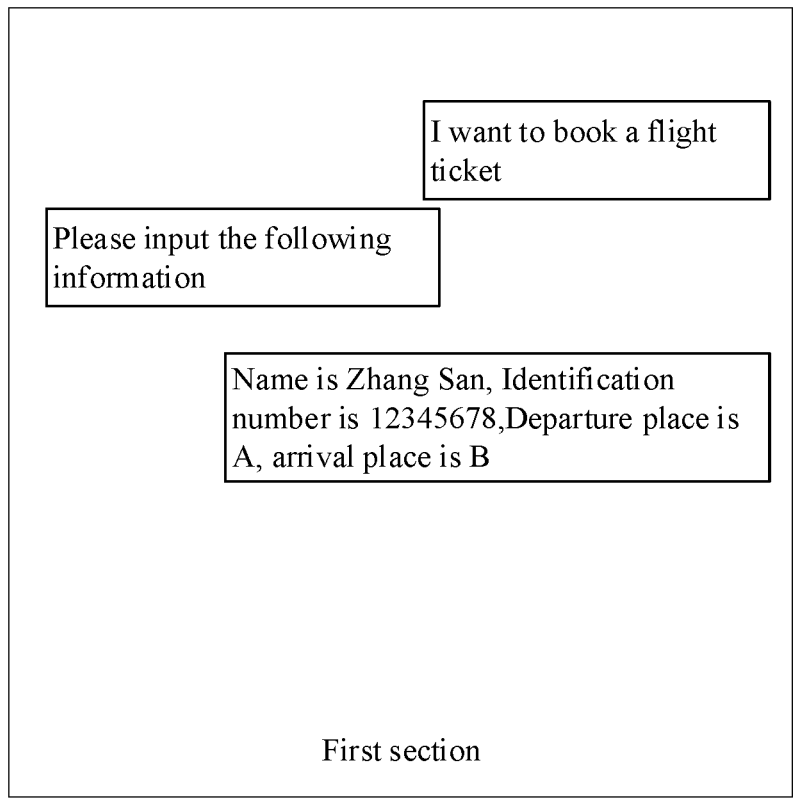

Subsequently, the smart customer service system may output the second content in the first section. In some embodiments, as shown in FIG. 7, the smart customer service system outputs the second content in the lower section of the corresponding position of the first content in the first section. The smart customer service system connects the target sentences including the phrases and the corresponding target strings through punctuations to obtain the second content, that is, "name is Zhang San, identification number is 12345678, departure place is A, arrival place is B," and outputs the second content below "I want to book a flight ticket" in the first section.

In another situation, the target positions may be vacant. The target positions may be configured to prompt the user to input the contents corresponding to the phrases. The target positions of the target sentences corresponding to the plurality of sub-contents of the first content may all be vacant, all include the initial strings, or partially be vacant and partially include the initial strings, which may depend on pre-configuration of the user or the historical user input data. If the smart customer service system may generate the initial strings from the historical user input data, the smart customer service system may fill in the initial strings at the target positions of the target sentences. If the smart customer service system may not generate the initial strings corresponding to the phrases from the historical user input data, the target positions of the corresponding target sentences may be vacant. For example, the historical user input data may only include the user's name: Zhang San. In this case, the target sentences may include "name is Zhang San," "identification number is \_\_\_\_\_," "departure place is \_\_\_\_\_," and "arrival place is \_\_\_\_\_."

Correspondingly, in process 104, outputting the second content in the first section at least based on the target strings may be implemented by the following method.

First, the smart customer service system may add the target strings at the target positions correlated with the phrases. That is, the smart customer service system may add the target strings input by the user received at the target positions at the vacant target positions of the corresponding target sentences. As such, the target sentences may at least include the target strings.

Then, the smart customer service system may generate the second content based on the target sentences including the target strings. For example, the smart customer service system may connect the target sentences including the target strings by using the connection signs or sentence connection words to form the paragraph to generate the second content.

Subsequently, the smart customer service system may output the second content in the first section. In some embodiments, as shown in FIG. 7, the smart customer service system outputs the second content in a lower section below the corresponding position of the first content in the first section. The smart customer service system connects the target sentences including the phrases and the corresponding target strings by using the punctuations to obtain the second content: "name is Zhang San, identification number is 12345678, departure place is A, arrival place is B." The smart customer service system outputs the second content below "I want to book a flight ticket" in the first section.

Figure 8:
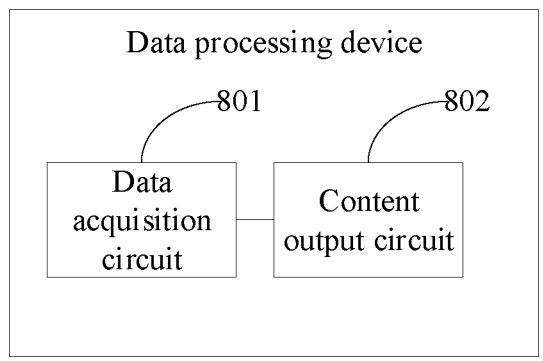
FIG. 8 illustrates a schematic structural diagram of a data processing device according to some embodiments of the present disclosure.

FIG. 8 illustrates a schematic structural diagram of a data processing device according to some embodiments of the present disclosure. The device may be arranged in an electronic apparatus, which can perform data input and output, such as a cell phone, a pad, or other terminals. The device of embodiments of the present disclosure may be mainly configured to improve the efficiency of obtaining the user input content through the output content when the electronic apparatus outputs the content.

In some embodiments, the data processing device includes a data acquisition circuit 801 and a content output circuit 802. The data acquisition circuit 801 may be configured to obtain the first input data of the user. The electronic apparatus may display the first input data in the first section. The content output circuit 802 may be configured to output the first content in the second section different from the first section based on the first input data. The first content may include the plurality of sub-contents. The plurality of sub-contents may be generated based on the phrases correlated with the first input data. The first content may be used to prompt the user to input the corresponding contents at the plurality of target positions corresponding to the plurality of sub-contents. The plurality of target positions may be correlated with the phrases corresponding to the plurality of sub-contents.

Embodiments of the present disclosure may provide a data processing device. The data processing device may output the first content in the second section different from the first section after obtaining the first input data input by the user and displayed in the first section. The first content may include the plurality of sub-contents. The plurality of sub-contents may be generated based on the phrases correlated with the first input data. Therefore, the first content may prompt the user to input the corresponding content at the target position corresponding to each sub-content. As such, in some embodiments, the data processing device may no longer output each sub-content in multiple times but output the first content including the plurality of sub-contents at one time in the display section different from the display section of the input data input by the user. As such, the first content may prompt the user to input the corresponding content at the target position corresponding to each sub-content, which is different from the current situation that the user may need to input the content individually for each output question individually. Thereby, the consumption time of outputting the sub-contents multiple times may be saved to improve the efficiency of obtaining the information.

In some embodiments, the data acquisition circuit 801 may be further configured to receive the target strings at the target positions input by the user.

Correspondingly, the content output circuit 802 may be further configured to output the second content in the first section based on the target strings. The second content may include two or more target sentences. The target sentences may include the target strings and the phrases.

In some embodiments, the content output circuit 802 outputting the first content in the second section different from the first section based on the first input data may be implemented by the following method.

The content output circuit 802 may obtain the phrase table based on the first input data. The phrase table may include at least two phrases correlated with the first input data. The phrases may characterize the vacant user information. In some embodiments, the data processing device may first recognize the text content and/or audio content of the first input data. Then, the data processing device may generate the phrase table from the plurality of phrases according to the text content and/or audio content. The phrase table may include at least two phrases correlated with the text content and/or audio content. For example, the data processing device may parse the text content and/or the audio content to obtain the feature information, which may characterize the user intention. Based on the feature information, the data processing device may select the phrases correlated with the text content and/or audio content from the plurality of phrases to obtain the phrase table.

The data processing device may generate the plurality of sub-contents based on the phrases of the phrase table to obtain the first content. In some embodiments, the data processing device may generate the target sentences corresponding to the phrases based on at least a sentence format corresponding to the phrases. The target sentence may include the phrases. The data processing device may generate the corresponding sub-contents based on the target sentences corresponding to the phrase. The sub-contents may form the first content.

The data processing device may then output the first content in the second section.

In some embodiments, the target sentences may include the target positions correlated with the phrases. The target positions may include the initial strings. The initial strings may be generated based on the historical user input data.

The content output circuit outputting the second content in the first section based on the target strings may be implemented by the following method.

The content output circuit may be configured to replace the initial strings at the target positions correlated with the phrases with the target strings.

The content output circuit may be configured to generate the second content based on the target sentences.

The content output circuit may be configured to output the second content in the first section.

In some other embodiments, the target sentences may include the target positions correlated with the phrases. The target positions may be vacant. The target positions may be used to prompt the user to input the contents corresponding to the phrases.

The content output circuit outputting the second content in the first section based on the target strings may be implemented by the following method.

The content output circuit may be configured to add the target strings at the target positions correlated with the phrases.

The content output circuit may be configured to generate the second content based on the target sentences.

The content output circuit may be configured to output the second content in the first section.

Figure 9:
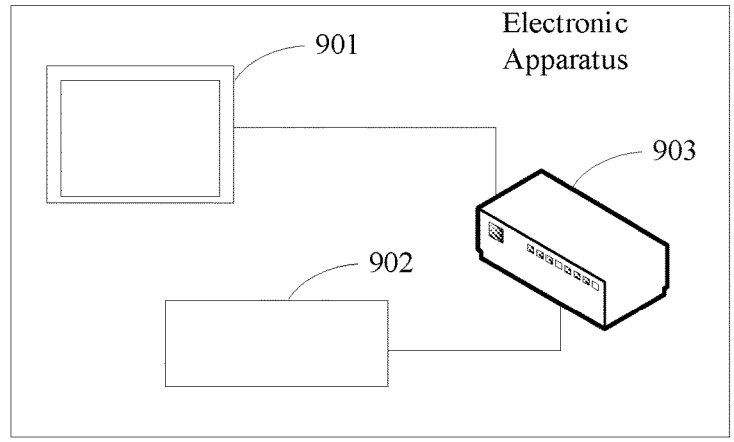
FIG. 9 illustrates a schematic structural diagram of an electronic apparatus according to some embodiments of the present disclosure.

FIG. 9 illustrates a schematic structural diagram of an electronic apparatus according to some embodiments of the present disclosure. The electronic apparatus may perform data input and output, such as a cellphone, a pad, or other terminals. In some embodiments, the electronic apparatus may be configured to improve the efficiency of obtaining the user input content through the output content when the electronic apparatus outputs the content.

In some embodiments, the electronic apparatus includes a display 901, an input device 902, and a processor 903. The display 901 may include the first section and the second section different from the first section. The display 901 may be configured to output the content. The input device 902 may be configured to obtain the first input data of the user. The display 901 may display the first input data in the first section. The display 901 and the input device 902 may be integrated into a physical structure by structures, such as a touch screen, etc. The physical structure may output the content and obtain the user input data simultaneously. The processor 903 may be configured to output the first content in the second section based on the first input data. The first content may include the plurality of sub-contents. The processor 903 may be configured to generate the plurality of sub-contents based on the phrases correlated with the first input data. The first content may be configured to prompt the user to input the corresponding contents at the plurality of target positions corresponding to the plurality of sub-contents. The plurality of target positions may be correlated with the phrases corresponding to the plurality of sub-contents.

In embodiments of the present disclosure, after obtaining the first input data input in the first section by the user, the electronic apparatus may be configured to output the first content in the second section different from the first section. the first content may include a plurality of sub-contents. The electronic apparatus may generate the plurality of sub-contents based on the phrases correlated with the first input data. As such, the first content may prompt the user to input the corresponding content at the target position corresponding to each sub-content. Therefore, in embodiments of the present disclosure, the electronic apparatus may no longer output each sub-content in multiple times but output the first content including the plurality of sub-contents at once in the display section different from the display section of the input data input by the user. As such, the first content may prompt the user to input the corresponding content at the target position corresponding to each sub-content, which is different from the current situation that the user may need to input the content individually for each question output individually. Thereby, the consumption time of outputting the sub-contents multiple times may be saved to improve the efficiency of obtaining the information.

For example, the electronic apparatus may be a cellphone, and the smart customer service system may be installed on the cellphone. This example is used to describe the technical solution of the present disclosure.

Figure 10:
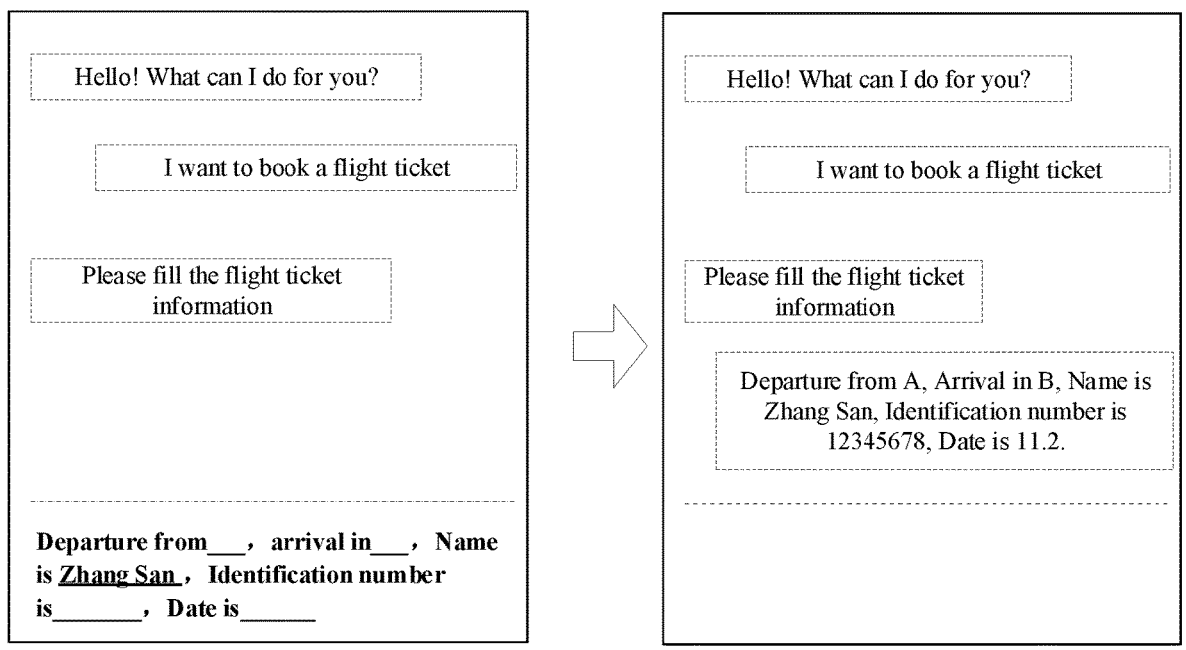
FIG. 10 and FIG. 11 illustrate schematic diagrams of a smart customer service system applied on a cell phone according to some embodiments in the present disclosure.

As shown in FIG. 10, in a conversation system interface of the smart customer service system of the cell phone, when the user opens the interface, the smart customer service system first outputs prompt information "Hello! What can I help you?" After the user inputs "I want to book a flight ticket," and when the smart customer service system of the cell phone needs to ask the user about the correlated information, the smart customer service system automatically calls a reply template to generate a complete reply sentence to let the user to fill to complete an information input operation.

Figure 11:
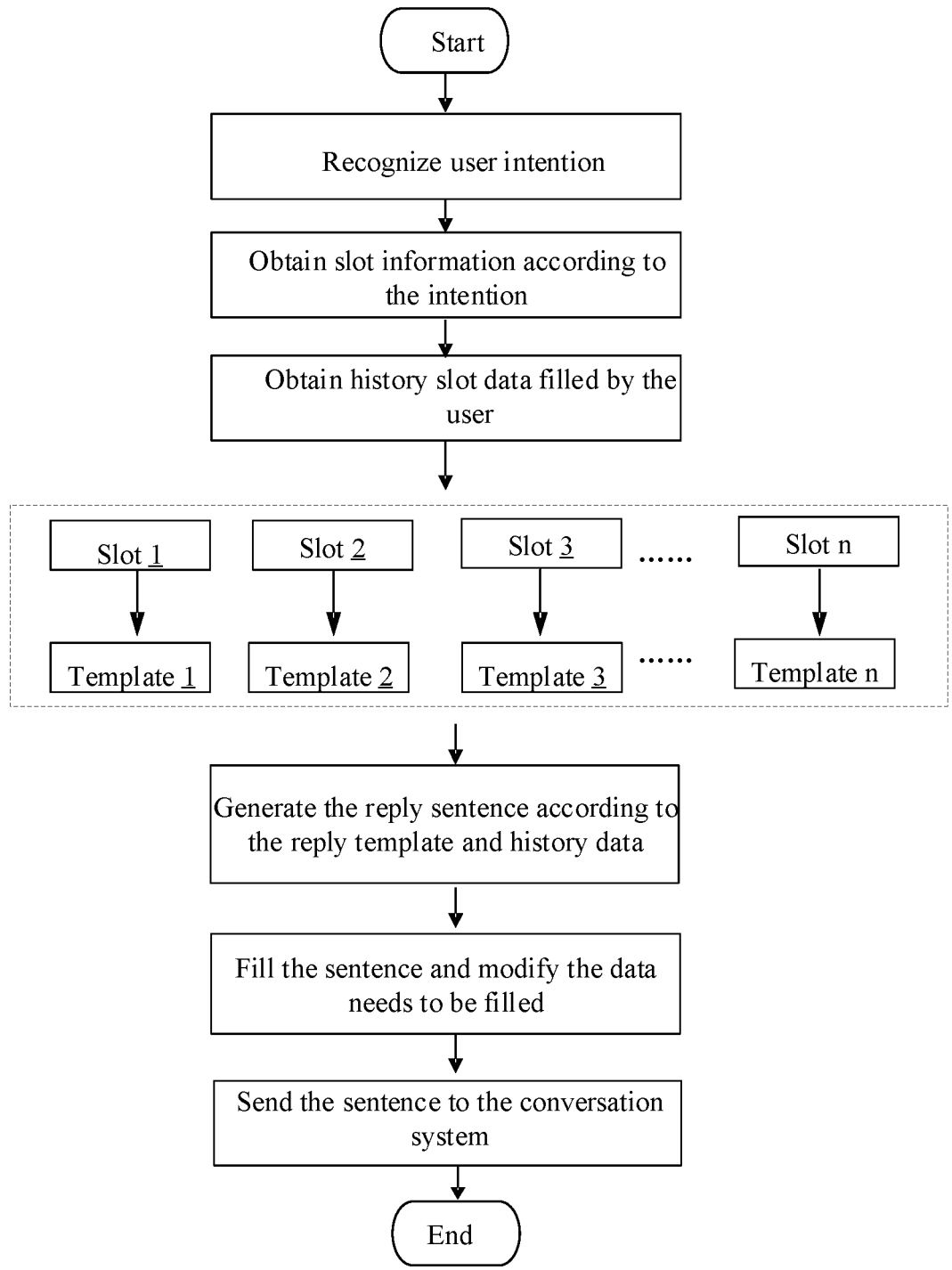

In connection with the schematic flowchart shown in FIG. 11, in the technical solution, after the user inputs the input data of "I want to book a flight ticket," the smart customer service system may use a natural language processing technology to recognize the intention of the user, for example, the intention to book a flight ticket. Then, according to the intention, the smart customer service system may obtain required slots, for example, departure place, arrival place, reservation person, departure date, etc. Meanwhile, the smart customer service system may obtain the data such as the name of the reservation person, etc., according to history information input by the user. Then, according to a predefined slot phrase template, the smart customer service system may fill the slots properly and add suitable transition words (e.g., punctuations, sentence connection words, etc.) to output the complete reply sentence. The smart customer service system may reserve places vacant where needs to be filled for the user to fill, such as, departure from _____, arrival in _____, name is Zhang San, identification number is _____, and departure date is _____. Correspondingly, after the user fills the information, the information is sent to the conversation system as departure from A, arrival in B, name is Zhang San, identification number is 12345678, and the departure date is 11.2.

As such, in the technical solution, the user may fill the information according to the relatively fixed template output in the interface, which may reduce the typing and filling operation. The solution may also facilitate the smart customer service system to recognize the conversation and extract corresponding key data.

As such, in the technical solution of the present disclosure, for each slot information that needs to be inquired, the smart customer service system may provide a corresponding reply sentence. When the conversation system needs to ask a plurality of slot information, the smart customer service system may automatically load the reply sentence template in the conversation filling section to connect in series into a complete sentence. In addition, in the technical solution, the smart customer service system may automatically extract and cooperate with the template to generate the reply sentence for the history user filling information. Correspondingly, the user may modify the reply sentence or directly fill vacant information of the template sentence.

Therefore, through the technical solution, the user may focus on service content on the cell phone, which may avoid multiple questions to cause the user to lose patience. Moreover, in the technical solution, the smart customer service system may help the user to generate the reply sentence automatically, and the user may only need to fill in the key information to reduce the user's operation. In addition, in the technical solution, all the slot information required to fill according to the intention of the current user is at a glance, which may be modified at any time. Moreover, the smart customer service system may inherit and display the history slot information, and the user may not need to confirm repeatedly.

Embodiments in the present disclosure are described in a progressive manner. Each embodiment focuses on the differences from other embodiments, and the same or similar parts between embodiments may refer to each other. For the device disclosed in the embodiment, since it corresponds to the method disclosed in embodiments, the description is relatively simple, and the relevant part can refer to the description of the method part.

Those of skill in the art may further realize that the units and algorithm steps of the examples described in embodiments of the present disclosure may be implemented by electronic hardware, computer software, or a combination thereof, in order to clearly illustrate the interchangeability of hardware and software. In the above description, the composition and steps of each example have been generally described in accordance with the functions. Whether these functions are executed by hardware or software depends on the specific application and design constraint conditions of the technical solution. Those skilled in the art may use different methods for each specific application to implement the described functions, but such implementations should not be considered beyond the scope of the present disclosure.

The steps of the method or algorithm described in embodiments disclosed in the present disclosure may be directly implemented by hardware, a software module executed by a processor, or a combination thereof. The software module may be stored in a random access memory (RAM), an internal memory, a read-only memory (ROM), an electrically programmable ROM, an electrically erasable programmable ROM, a register, a hard disk, a removable disk, a CD-ROM, or any other known storage media in the technical field.

The description of disclosed embodiments may enable those skilled in the art to implement or use the present disclosure. Various modifications to embodiments may be obvious to those skilled in the art. The general principle defined in the present disclosure may be implemented in other embodiments without departing from the spirit or scope of the present disclosure. Therefore, the present disclosure may not be limited to the embodiments shown in the specification but should conform to the widest scope consistent with the principles and novel features disclosed in the present disclosure.

What is claimed is:

1. A data processing method, comprising:
obtaining a first input of a user and displaying a first content in a first section, the first content representing a content corresponding to the first input; and
in response to displaying the first content in the first section, outputting, based on the first content, a second content in a second section different from the first section, the second content including phrases correlated with the first content and a plurality of target positions each between adjacent ones of the phrases, the second content being in a form of a fill-in-the-blank question including a plurality of blanks to be filled, the plurality of blanks to be filled corresponding to the plurality of target positions with a plurality of corresponding data attributes derived from the first content, the second content prompting for the user to input corresponding contents at the plurality of target positions with the plurality of corresponding data attributes to fill the plurality of blanks to be filled, the plurality of target positions being correlated with the phrases, and each the plurality of target positions in the second content being underlined;
obtaining a plurality of target strings at the plurality of the target positions to answer the fill-in-the-blank-question; and
outputting a third content in the first section as a second input of the user, the third content being in a form of the answered fill-in-the-blank-question, positions in the third content corresponding to the plurality of target positions being not underlined, and the first section and the second section being in two different display areas.

2. The method of claim 1, wherein outputting the second content in the second section different from the first section based on the first content includes:
obtaining a phrase table based on the first content, the phrase table including two or more phrases correlated with the first content, and the two or more phrases characterizing vacant user information;
generating a plurality of second sub-contents to obtain the second content based on the two or more phrases of the phrase table; and
outputting the second content in the second section.

3. The method of claim 2, wherein obtaining the phrase table based on the first content includes:
recognizing a text content or audio content of the first content; and
generating the phrase table from a plurality of phrases according to the text content or audio content, the phrase table including the two or more phrases correlated with the text content or audio content.

4. The method of claim 3, wherein generating the phrase table from the plurality of phrases according to the text content or audio content includes:
parsing the text content or audio content to obtain feature information for characterizing user intention; and
selecting the two or more phrases correlated with the text content or audio content from the plurality of phrases based on the feature information to obtain the phrase table.

5. The method of claim 2, wherein generating the plurality of second sub-contents based on the two or more phrases of the phrase table includes:
generating target sentences corresponding to the two or more phrases based on at least a sentence template corresponding to the two or more phrases, the target sentences including the two or more phrases; and
generating corresponding second sub-contents based on the target sentences corresponding to the two or more phrases, the second sub-contents forming the second content.

6. The method of claim 1, wherein:
one or more of the plurality of target positions include initial strings;
the initial strings are generated based on historical user input data;
and outputting the third content in the first section based on the target strings includes:
generating the target sentences by replacing the initial strings at the one or more of the plurality of target positions with corresponding target strings;
generating the third content based on the target sentences; and
outputting the third content in the first section.

7. The method of claim 1, wherein:
outputting the third content in the first section based on the target strings includes:
generating the target sentences by adding the target strings at one or more of the plurality of target positions; generating the third content based on the target sentences; and outputting the third content in the first section.

8. The method of claim 1, wherein:
the second content is in a form of a paragraph including the phrases and the plurality of target positions.

9. The method of claim 1, further comprising:
obtaining a plurality of target strings at the plurality of the target positions; and
outputting a third content in the first section as a second input of the user, the third content is in a form of a paragraph including the phrases and the plurality of target strings.

10. A data processing device comprising:
a data acquisition circuit, configured to obtain a first input of a user, a first content being displayed in a first section, the first content representing a content corresponding to the first input; and
a content output circuit, configured to output, in response to displaying the first content in the first section, a second content based on the first content in a second section different from the first section; the second content including phrases correlated with the first content and a plurality of target positions each between adjacent ones of the phrases, the second content being in a form of a fill-in-the-blank question including a plurality of blanks to be filled, the plurality of blanks to be filled corresponding to the plurality of target positions with a plurality of corresponding data attributes derived from the first content, the second content prompting for the user to input corresponding contents at the plurality of target positions with the plurality of corresponding data attributes to fill the plurality of blanks to be filled, the plurality of target positions are correlated with the phrases, and each the plurality of target positions in the second content being underlined;

wherein:
the data acquisition circuit is further configured to obtain a plurality of target strings at the plurality of the target positions to answer the fill-in-the-blank-question; and
the content output circuit is further configured to output a third content in the first section as a second input of the user, the third content being in a form of the answered fill-in-the-blank-question, positions in the third content corresponding to the plurality of target positions being not underlined, and the first section and the second section being in two different display areas.

11. The device of claim 10, wherein the content output circuit is further configured to:
obtain a phrase table based on the first content, the phrase table including two or more phrases correlated with the first content, and the two or more phrases characterizing vacant user information;
generate a plurality of second sub-contents to obtain the second content based on the two or more phrases of the phrase table; and
output the second content in the second section.

12. The device of claim 11, wherein the content output circuit is further configured to:
recognize a text content or audio content of the first content; and
generate the phrase table from a plurality of phrases according to the text content or audio content, the phrase table including the two or more phrases correlated with the text content or audio content.

13. The device of claim 12, wherein the content output circuit is further configured to:
parse the text content or audio content to obtain feature information for characterizing user intention; and
select the two or more phrases correlated with the text content or audio content from the plurality of phrases based on the feature information to obtain the phrase table.

14. The device of claim 11, wherein the content output circuit is further configured to:
generate target sentences corresponding to the two or more phrases based on at least a sentence template corresponding to the two or more phrases, the target sentences including the two or more phrases; and
generate corresponding second sub-contents based on the target sentences corresponding to the two or more phrases, the second sub-contents forming the second content.

15. The device of claim 10, wherein:
one or more of the plurality of target positions include initial strings;
the initial strings are generated based on historical user input data;
and the content output circuit is further configured to:
replace the initial strings at the one or more of the plurality of target positions with corresponding target strings;
generate a third content based on the target sentences; and
output the third content in the first section.

16. The device of claim 10, wherein:
the content output circuit is further configured to:
add the target strings at one or more of the plurality of target positions;
generate the third content based on the target sentences; and
output the third content in the first section.

17. An electronic apparatus comprising:
a display, including a first section and a second section different from the first section and configured to output a content;
an input device, configured to obtain a first input of a user, a first content being displayed in the first section, the first content representing a content corresponding to the first input; and
a processor, configured to:
output, in response to displaying the first content in the first section, a second content in the second section based on the first content, the second content including phrases correlated with the first content and a plurality of target positions each between adjacent ones of the phrases, the second content being in a form of a fill-in-the-blank question including a plurality of blanks to be filled, the plurality of blanks to be filled corresponding to the plurality of target positions with a plurality of corresponding data attributes derived from the first content, the second content promoting for the user to input corresponding contents at the plurality of target positions with the plurality of corresponding data attributes to fill the plurality of blanks to be filled, the plurality of target positions being correlated with the phrases, and each the plurality of target positions in the second content being underlined;
obtain a plurality of target strings at the plurality of the target positions to answer the fill-in-the-blank-question; and
output a third content in the first section as a second input of the user, the third content being in a form of the answered fill-in-the-blank-question, positions in the third content corresponding to the plurality of target positions being not underlined, and the first section and the second section being in two different display areas.

* * * * *